(12) United States Patent
Nishino et al.

(10) Patent No.: US 6,535,463 B2
(45) Date of Patent: Mar. 18, 2003

(54) METHOD AND APPARATUS FOR HIGH DENSITY RECORDING OF DATA ON A DISK, AND RECORDING MEDIUM PRODUCED THEREBY

(75) Inventors: Masatoshi Nishino, Tokyo (JP); Junichi Horigome, Tokyo (JP)

(73) Assignee: Sony Corporation, Tokyo (JP)

( * ) Notice: Subject to any disclaimer, the term of this patent is extended or adjusted under 35 U.S.C. 154(b) by 7 days.

(21) Appl. No.: 09/735,100

(22) Filed: Dec. 12, 2000

(65) Prior Publication Data

US 2001/0038506 A1 Nov. 8, 2001

(30) Foreign Application Priority Data

Dec. 14, 1999 (JP) .......................................... 11-354990

(51) Int. Cl.[7] .............................. G11B 11/00; G11B 5/09
(52) U.S. Cl. ........................ 369/13.01; 360/59; 360/49; 369/275.3
(58) Field of Search ............................... 360/51, 59, 48, 360/49, 55; 369/275.3, 275.4, 13.01, 13.41, 13.42, 13.55, 13.56

(56) References Cited

U.S. PATENT DOCUMENTS

| | | | |
|---|---|---|---|
| 4,001,883 A | * | 1/1977 | Strout et al. ................... 360/48 |
| 4,734,901 A | * | 3/1988 | Murakami .................... 360/48 |
| 5,883,863 A | * | 3/1999 | Itakura et al. ........... 369/13.05 |

* cited by examiner

*Primary Examiner*—Alan T. Faber
(74) *Attorney, Agent, or Firm*—Frommer Lawrence & Haug LLP; William S. Frommer

(57) ABSTRACT

A recording medium comprising a data-recording surface is formed of plural tracks, with a respective track having a data section in which units of data are to be recorded. Only one header section is provided before the data section, the header section serving as a reference position for dividing said track into sectors. The header section is defined by prepits formed in the data-recording surface. As a result, data is recorded in the header section at such a high density that the header data is reproduced with super resolution.

10 Claims, 8 Drawing Sheets

METHOD AND APPARATUS FOR HIGH DENSITY RECORDING OF DATA ON A DISK, AND RECORDING MEDIUM PRODUCED THEREBY

BACKGROUND OF THE INVENTION

The present invention relates to a method and apparatus for recording data signals on a disk-shaped recording medium, and to a recording medium for recording data signals.

Hitherto provided is so-called "magnetically induced super resolution (MSR) technique." The MSR technique uses a material-characterized mask the behavior of which changes in accordance with the heat applied to the material. The changes in the behavior of the mask is utilized to record data at high density on a magneto-optical disk, thereby to reproduce images of super resolution, that is to reproduce images having high resolution that cannot be attained by optical reproduction technique.

A switched-connection, multi-layer film is used to provide an MSR magneto-optical disk. First, the principle of MSR will be explained, with reference to two types of two-layer magnetic films.

MSR achieved by means of FAD (Front Aperture Detection) will be described, with reference to FIG. 1.

FIG. 1 shows various directions in which the two-layer magnetic film formed on the recording surface of a magneto-optical disk may be magnetized. The magnetic film is composed of two layers 101 and 102. The first layer 101, or surface layer, is a reproducing layer. The second layer 102, or a base layer, is a recording layer. This holds true in any description that follows.

As shown at A in FIG. 1, the reproducing layer 101 and the recording layer 102 are magnetized in the direction opposite to the direction of an external magnetic field. As shown at B in FIG. 1, the reproducing layer 101 and the recording layer 102 are magnetized in the direction identical to the direction of an external magnetic field. Also shown in FIG. 1 is an interface magnetic wall 100 at which the magnetism of the reproducing layer 101 meets that of the recording layer 102.

As shown at A in FIG. 1, the direction of magnetization of the reproducing layer 101 is inverted when the temperature of the layer 101 rises from room temperature. That is, the direction is inverted when the intensity of the external magnetic field surpasses the sum of the coercive force and exchange force of there producing layer 101. When the temperature of the recording layer 101 falls to room temperature, the direction of magnetization of the layer 101 changes to become the same as the direction of magnetization of the recording layer 102.

As shown at B in FIG. 1, the direction of magnetization of the reproducing layer 101 remains unchanged even if the temperature of the layer 101 rises from room temperature. In other words, the direction is the same as the direction of magnetization of the recording layer 102.

MSR accomplished by RAD (Rear Aperture Detection) will be described, with reference to FIG. 2.

As shown at A in FIG. 2, the magnetic field of the reproducing layer 101 extends in the direction opposite to the direction of the external magnetic field, whereas the magnetic field of the recording layer 102 extends in the same direction as the direction of the external magnetic field. As shown at B in FIG. 2, both the reproducing layer 101 and the recording layer 102 are magnetized in the direction identical to the direction of the external magnetic field.

Namely, in the initial state, or at room temperature, the reproducing layer 101 is magnetized in a specific direction, irrespective of the direction of magnetization of the recording layer 102. When the temperature of the reproducing layer 101 rises from room temperature, the direction of magnetization of the reproducing layer 101 changes, becoming the same as that of the recording layer 102.

As shown at A in FIG. 2, the direction of magnetization of the reproducing layer 101 is inverted when the intensity of the external magnetic field surpasses the sum of the coercive force and exchange force of the layer 101. As shown at B in FIG. 2, the reproducing layer 101 remains magnetized as long as the sum of its coercive force and exchange force surpasses intensity of the external magnetic field.

It suffices to impart a proper intensity to the external magnetic field in order to maintain this relationship. Nonetheless, it is necessary to impart a large coercive force to the recording layer 102. Once the temperature of the reproducing layer 101 falls to room temperature, the reproducing layer 101 is magnetized in the same direction as the recording layer 102. Therefore, only the reproducing layer 101 is initialized and magnetized in the direction opposite to the direction of magnetization of the recording layer 102. Thus, one cycle of operation is terminated.

In summary, the reproducing layer 101 is magnetized in a certain direction when FAD shown in FIG. 1 is carried out. When the RAD shown in FIG. 2 is performed, the reproducing layer 101 is magnetized in the same direction as the recording layer 102.

Assume that the magnetized state of the recording layer 102 corresponds to a signal recorded on it. Then, in the process of reading data from the reproducing layer 101, a mark will disappear when FAD (FIG. 1) is effected and will appear when RAD (FIG. 2) is performed.

What is important is a temperature rise during the reproduction of data. The magneto-optical disk is rotating at all times. From this it can be understood that any part of the disk that follows the laser-beam spot formed on the disk will be heated to high temperature.

This fact may be taken into account when the magnetic layers are adjusted to cause the inversion shown in FIG. 1 and 2 at the high temperature to which that part of the disk has been heated. Then, two recording media illustrated in FIG. 3 may be designed.

Either recording medium shown in FIG. 3 comprises a reproducing layer 101, a recording layer 102 and a base layer 104. The base layer 104 has lands and grooves at the upper surface. The recording layer 102 is provided on the base layer 104, and the reproducing layer 101 is provided on the recording layer 102. Marks 112 at which signals are recorded are provided on each land.

As shown in FIG. 3, two marks 112 are irradiated with the laser-beam spot 113.

In FIG. 3, each dot indicates a mark that is appearing, or a part of the recording layer 102 which is seen through the reproducing layer 101 because the reproducing layer 101 is magnetized in the same direction as the recording layer 102.

Each circle shown in FIG. 3 indicates a mark that has disappeared, or a part of the recording layer 102 which is not seen through the reproducing layer 101 because the reproducing layer 101 is magnetized in a direction different from the direction in which the recording layer 102 is magnetized.

The magnetic layers may be adjusted such that a mark disappears at the high-temperature part as is shown at A in FIG. 3. In this case, the signal will be detected only at the part in front of the laser-beam spot 113. This manner of signal detection is therefore called "FAD (Front Aperture Detection)."

Conversely, the magnetic layers may be adjusted such that a mark appears at the high-temperature part as is shown at B in FIG. 3. If so, the signal will be detected only at the part at the rear of the laser-beam spot 113. This signal detection is therefore called "RAD (Rear Aperture Detection)."

Both FAD and RAD can detect a signal from only a part of the laser-beam spot 113. Advantage attained by using a pinhole can be achieved, whichever signal detection, FAD or RAD, is carried out.

MSR can be accomplished not only by FAD and RAD, but also by another method recently proposed. This is made possible thanks to the re-designing of the magnetic layers. The concept of the new method will be described, along with RAD and RAD, with reference to FIG. 4.

FIG. 4 shows thee lands 111. Marks 112, some seen and others not seen, are provided on each land 111. A laser-beam spot 113 moves on the land 111, toward the left. A high-temperature part 114 follows the laser-beam spot 113. In FIG. 4, too, each dot indicates a mark that is seen, and each circle represents a mark that is not seen.

FAD, wherein a mark preceding the laser-beam spot 113 is read, is illustrated at A in FIG. 4. RAD, wherein a mark following the laser-beam spot 113 is read, is depicted at B in FIG. 4. Shown at C in FIG. 4 is CAD (Central Aperture Detection), in which a mark is read at the center of the laser-beam spot 113.

CAD will be described in detail, with reference to FIG. 5. As shown at A in FIG. 5, with CAD it is possible to read a film at the center of the laser-beam spot 113 moving over the land 111. As seen from B in FIG. 5, that part of the land 111 that precedes the center of the spot 113 a little is at higher temperature than any other part.

As shown at C in FIG. 5, CAD is performed on a three-layer structure. The first layer is a reproducing layer 101, the second layer is a non-magnetic layer 102 made of AlN or the like, and the third layer is a recording layer 102. The reproducing layer 101 is magnetized in horizontal direction at room temperature. The recording layer 102 is magnetized in vertical direction. The non-magnetic layer 103 is interposed between the reproducing layer 101 and the recording layer 102.

Vertical magnetization anisotropy may surpass horizontal magnetization anisotropy in the reproducing layer 101 as the temperature of the disk rises. In this case, the data is transferred from the recording layer 102 to the reproducing layer 101 by virtue of magnetostatic coupling the non-magnetic layer 103 achieves.

No MO signals are detected from the reproducing layer 101 that is magnetized in horizontal direction. In CAD, data can be reproduced without using an external magnetic field. By contrast, an external magnetic field is indispensable to reproduce data in FAD and RAD.

CAD is advantageous in terms of reduction of track pitch. This is because CAD helps to increase resolution not only in the linear direction, but also in the direction of tracks.

In conventional recording media, the header section, which is the reference position for dividing the recording surface into sectors, is defined by pre-pits made in the recording surface. The recording density at the header section is inevitably limited by the wavelength of the light beam applied to the disk to read signals from the pits.

To enhance the recording density of the conventional recording media, the MSR technique is employed, in some cases, to record data in the data section of a medium, by using the header section defined by pre-pits, as the reference position for dividing the recording surface into sectors. It is demanded that the recording capacity of such a recording medium be increased so that the medium may record more and more data.

BRIEF SUMMARY OF THE INVENTION

The present invention has been made in consideration of the foregoing. The object of the invention is to provide a method and apparatus for recording data on a disk at high density, thus increasing the recording capacity of the disk, and also a recording medium that can record data at high density and therefor has a large recording capacity.

To achieve the object, a data-recording method according is provided according to this invention. The method records data on a disk that has a data-recording surface having a data section in which units of data are to be recorded and a header section which is provided before the data section and serves as a reference position of the data section. The method comprises a step of recording data in the header section at such a high density that the data is reproduced with a super resolution.

A data-recording apparatus according to the invention records data on a disk that has a data-recording surface having a data section in which units of data are to be recorded and a header section which is provided before the data section serves as a reference position of the data section. The apparatus comprises means for recording data in the header section at such a high density that the data is reproduced with a super resolution.

A recording medium according to the present invention has a data-recording surface. The data-recording surface has a data section and a header section. Units of data are to be recorded in the data section. The header section is provided before the data section and serves as a reference position of the data section. Data is recorded in the header section at such a high density that the data is reproduced with a super resolution.

In the present invention, data is recorded in the header section of each sector at as high a density as in the data section, so that MSR reproduction may be accomplished. That is, data can be recorded in the header section at higher density than in the conventional recording medium, which has optical limitations. The invention can therefore provide a recording medium that has a large recording capacity.

Moreover, in this invention, only one header defined by pre-pits is formed in the surface of a recording medium, and any other headers are magnetically recorded on the recording medium. This enhances the recording density of the medium.

Since data is recorded on the recording medium at a density that accords with MSR reproduction and only one header defined by pre-pits is formed in the surface of the medium, the recording density can increase by 2% to 5% in the case of a 5.25-inch MO drive.

In the case where MSR is attained by FAD or RAD, a magnetic filed is applied in a data-erasing direction for the first identifier, and in a data-recording direction for the second identifier. Therefore, it is unnecessary to invert the direction of magnetic field to erase or record data from or in the data section. Nor is it necessary to invert the direction of magnetic field to reproduce the identifiers and the data from the data section. This helps to shorten the data-erasing time and the data-recording time.

DETAILED DESCRIPTION OF THE INVENTION

An embodiment of the present invention will be described, with reference to the accompanying drawings. The embodiment is a magneto-optical disk drive for recording data signals on a magneto-optical disk and reproducing the data signals therefrom.

Figure 6:
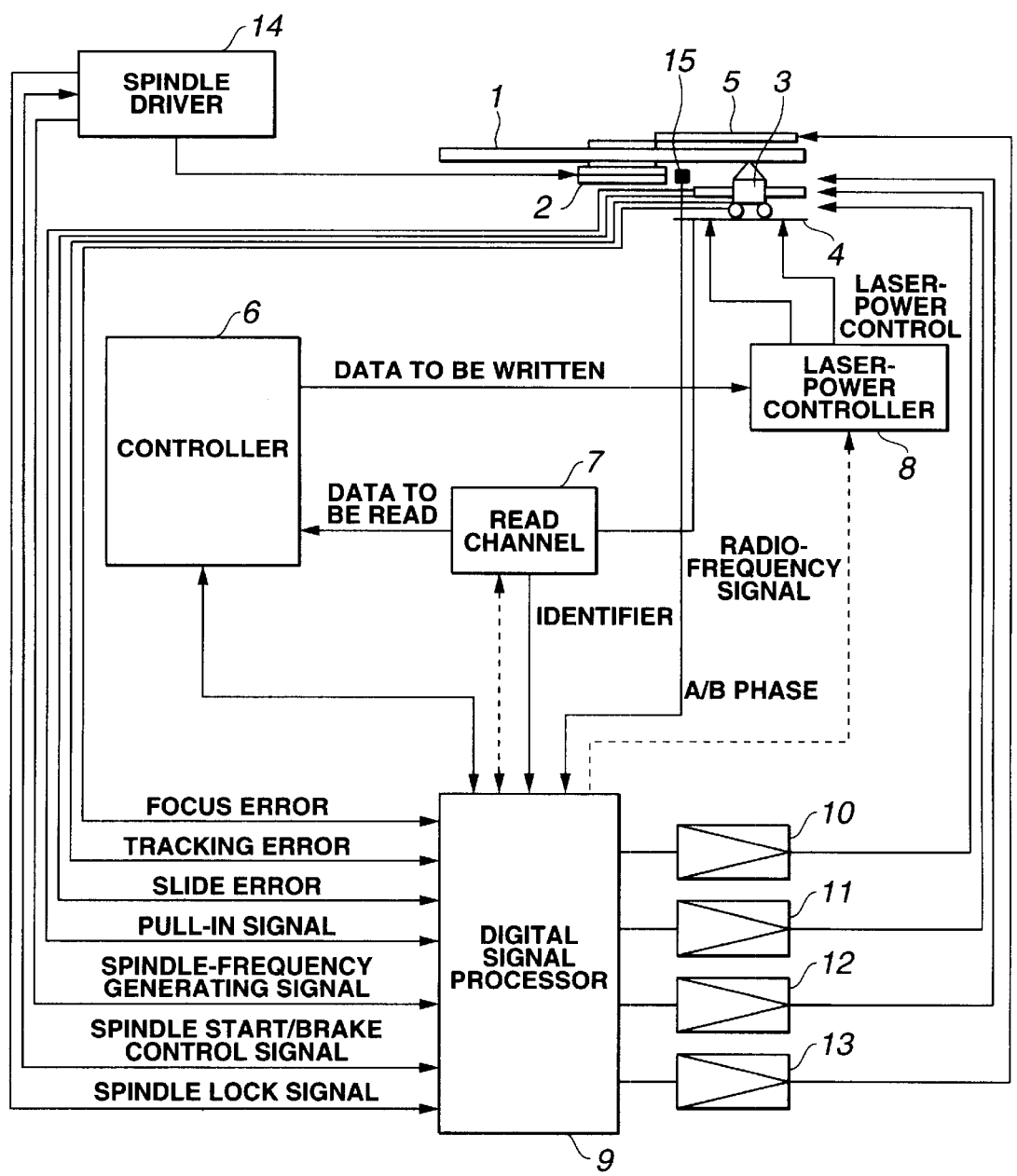
FIG. 6 is a block diagram of a magneto-optical disk drive.

As shown in FIG. 6, the magneto-optical disk drive comprises a spindle motor 2, an optical block 3, a block carriage 4, and a linear encoder 15. The spindle motor 2 rotates a magneto-optical disk 1. The optical block 3 applies a laser beam to the magneto-optical disk 1 and receives the laser beam reflected from the disk 1. The block carriage 4 supports and moves the optical block 3 in the radial direction of the magneto-optical disk 1. The linear encoder 15 detects the distance the optical block 3 has been moved.

In the embodiment, the magneto-optical disk 1 is one to which MSR achieved by RAD described above is applied.

If MSR technique is applied to a rewritable magneto-optical disk, resolution can be obtained which is higher than the maximum resolution the optical system of the drive can attain. The MSR technique is therefore an effective means for enhancing the recording density. The magneto-optical disk 1 may be one having a diameter of 5.25 inches and generally known as "MO disk."

The MO disk has a specific recording format. On its recording surface, sectors are arranged in accordance with zone CAV (Constant Angular Velocity). Each sector has a header section and a data section. The header section serves as a reference position for the data section. Servo data and the like are recorded in the header section.

The disk is rotated at the zone CAV. The recording surface of the disk is divided into zones, which are arranged in the radial direction of the disk. Each zone is divided into sectors, which are arranged in the circumferential direction of the disk. In each zone, the sectors have the same length and the same recording frequency is applied to each sector. The sector length and the recording frequency change from zone to zone.

Figure 7A:
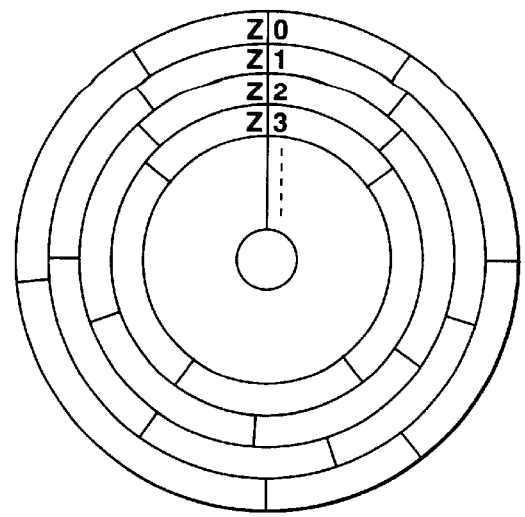
FIG. 7 is a diagram showing the sectors provided on the recording surface of a magneto-optical disk.
Figure 7B:
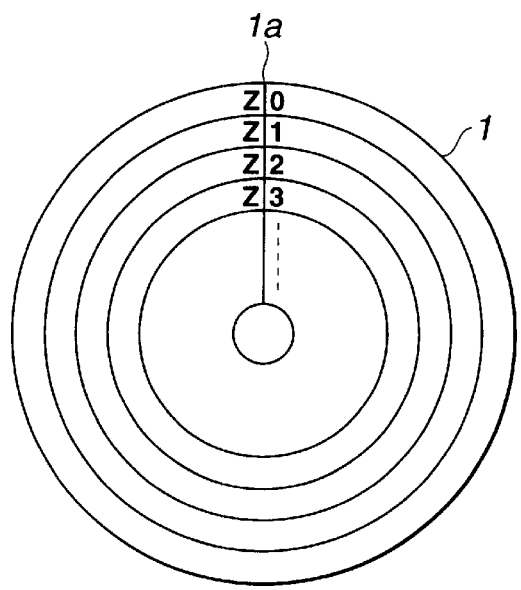

Since the sector length in one zone is different from that in another zone, the header sections of a sector have positions different from those of another sector, as is illustrated at A in FIG. 7. Hitherto, pre-pits define the header section of each sector. In FIG. 7, Z0, Z1, Z2, Z3, c are the serial numbers of the zones.

As shown at B in FIG. 7, the magneto-optical disk 1 used in the present embodiment has so-called soft sectors. In the header of each soft sector, data is recorded at a density that accords with MSR reproduction, in order to enhance the recording density of the header section and increase the recording capacity of the entire magneto-optical disk 1.

More specifically, the magneto-optical disk 1 has only one pre-pit section 1a which extends in the radial direction of the disk 1 and which serves as a reference position for recording data in the header section of each sector. The pre-pit section 1a serves as a reference position for measuring the angle through which the disk 1 has rotated.

Using the pre-pit section 1a as positional reference, header sections serving as reference positions for sector division are formed at a density that accords with the MSR reproduction. Data sections are provided in accordance with the positions of the header sections thus formed.

All header sections, except the sole pre-pit section 1a, are formed at the density that accords with the MSR reproduction. The MSR reproduction achieves a resolution that is not limited by any optical entity such as the pre-pit section 1a. Hence, data is can be recorded in the header section of each sector at as high a density as in the data section. This reduces the redundancy of the header sections.

The magneto-optical disk 1 is provided by the manufacturer, with the header sections already formed on it. The user may record data sections, which follow the header sections. Soft sectors are thereby formed on the recording surface of the magneto-optical disk 1.

Figure 8:
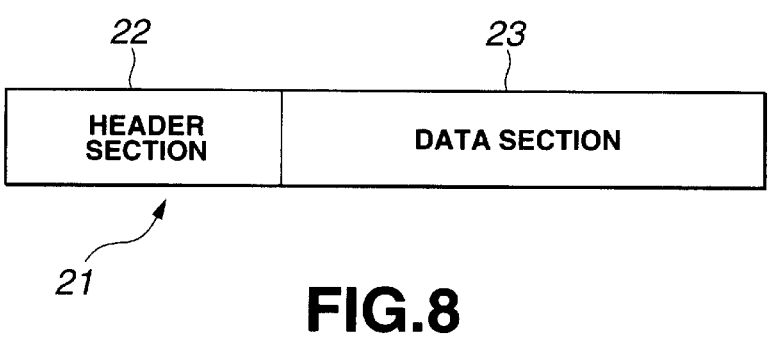
FIG. 8 is a diagram depicting one of the sectors shown in FIG. 7.

Data is recorded on the magneto-optical disk 1 in such a format as is illustrated in FIG. 8. As FIG. 8 shows, each sector 21 formed on the disk 1 is composed of a header section 22 and a data section 23. The header section 22 has a fixed length. The data section 23 has a fixed length, too.

Figure 9A:
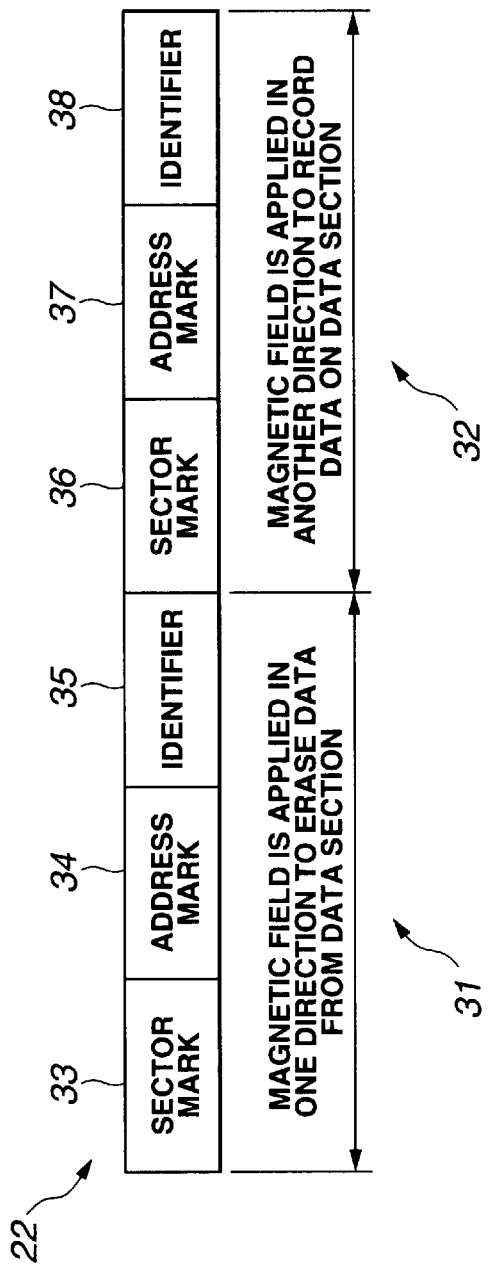
FIG. 9 illustrates two types of header section each sector may have.
Figure 9B:
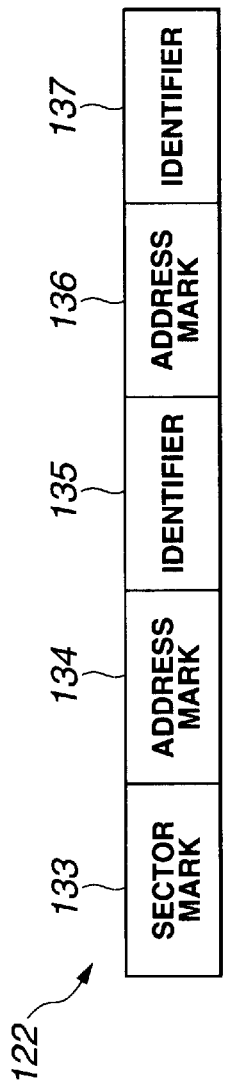

As shown at A in FIG. 9, the header section 22 is composed of two parts 31 and 32. In the first part 31 there are recorded the first sector mark 33, the first address mark 34 and the first identifier (ID) 35, which are arranged in the order mentioned.

In the second part 32 of the header section 22 there are recorded the second sector mark 36, the second address mark 37 and the second identifier 38, which are arranged in the order they are mentioned.

In the MSR reproduction that requires an external magnetic field, almost the same data is recorded in both parts 31 and 32 of the header section 22. The data is recorded in the first part 31 by applying a magnetic field in one direction, and in the second part 32 by applying a magnetic field in another direction. As described above, the MSR technique that requires an external magnetic field may be performed by either FAD or RAD.

In the present embodiment, magnetic fields of different directions are applied to the first and second parts 31 and 32 of the header section 22, respectively, so that it may be unnecessary to invert the direction of magnetic field to erase or record data from or in the data section 23.

More specifically, a magnetic filed of one direction is applied to the first part 31, thereby to erase data from the data section 23, and a magnetic field of another direction is applied to the second part 32, thereby to record data on the data section 23.

Thus, the data can be read from the first part 31 when data is erased from the data section 23, and the data can be read from the second part 32 when data is recorded on the data section 23. In other words, data can be first read from the header section 22 and data can then be erased from or recorded on the data section 23, without inverting the direction of magnetic field. This helps to shorten the data-erasing time and the data-recording time.

FIG. 9 shows, at B, a header section 122 of conventional type. In the header section 122 there are recorded a sector mark 133, a first address mark 134, a first identifier 135, a second address mark 136 and a second identifier 137. The first address mark 134 follows the sector mark 133, the first identifier 135 follows the first address mark 134, the second address mark 136 follows the first identifier 235, and the second identifier 137 follows the second address mark 134.

Data is recorded on all parts of this header section 122 by applying a magnetic field in the same direction thereto. That is, magnetic fields of different directions need not be applied to the parts of the header section 122 to record data on the header section 122.

The spindle motor 2 rotates a turntable on which the magneto-optical disk 1 is mounted. Thus, the motor 2 spins the magneto-optical disk 1. The optical block 3 has a laser diode, a photo detector (PD), an objective lens, and the like. The laser diode applies a laser beam to the magneto-optical disk 1. The photo detector receives a light beam reflected from the magneto-optical disk 1. The objective lens opposes the magneto-optical disk 1, focuses the laser beam on the disk 1, and collects light reflected therefrom.

The optical block 3 reads data having MSR from the header section and data section of each sector provided on the magneto-optical disk 1. The block 3 also writes data at such a high density that data having MSR may be reproduced. Data can be written in the header section at a density high enough to reproduce data having MSR. In the present embodiment, the optical block 3 performs RAD to accomplish MSR reproduction from the magneto-optical disk 1. How data is recorded and reproduced from the disk 1 will be described later in detail.

The block carriage 4 supports the optical block 3 and can move the block 3 in the radial direction of the magneto-optical disk 1. It is designed in the form of, for example, a slide bearing. The linear encoder 15 detects the distance the optical block 3 is moved by the block carriage 4, by utilizing a magnetic interaction.

As shown in FIG. 6, the magneto-optical disk drive further comprises a controller 6, a read channel 7, a laser-power controller (LPC) 8, and a digital signal processor (DSP) 9. The read channel 7 receives radio-frequency signals from the optical block 3 and processes these signals. The laser-power controller 8 controls the intensity of the laser beam emitted from the optical block 3. The controller 6 controls the other components of the magneto-optical disk drive. The digital signal processor 9 performs a specific process on digital signals.

The read channel 7 receives a radio-frequency signal from the optical block 3 in accordance with the signal supplied from the digital signal processor 9. The channel 7 then extracts data and identifier from the radio-frequency signal. The channel 7 supplies the data to the controller 6 and the identifier to the digital signal processor 9.

The laser-power controller 8 controls the intensity of the laser beam emitted from the optical block 3, in accordance with the signal supplied from the digital signal processor 9. The laser-power controller 8 receives data from the controller 6 and supplies the same to the optical block 3, so that the data may be written on the magneto-optical disk 1 as the laser beam of the intensity controlled is applied to the magneto-optical disk 1.

The controller 6 controls the other components of the magneto-optical disk drive. For example, the controller 6 performs a specific process on the data supplied from the digital signal processor 9 and the read channel 7. The data processed is supplied to the laser-power controller 8.

The digital signal processor 9 effects a specific process on digital signals. More specifically, the processor 9 processes digital signals in accordance with the identifier and signal supplied from the read channel 7, the data supplied from the controller 6 and the data supplied from the linear encoder 15 and representing the distance the optical block 3 has been moved. The processor 9 supplies data to the controller 6 and signals to the read channel 7 and laser-power controller 8. The digital signal processor 9 processes various driver signals, too, as will be described later.

As shown in FIG. 6, the magneto-optical disk drive further comprises a focus driver 10, a tracking driver 11, a slide driver 12, a bias magnet driver 13, and a spindle driver 14. The focus driver 10 moves the objective lens toward and away from the magneto-optical disk 1. The tracking driver moves the objective lens in the radial direction of the disk 1. The slide driver 12 slides the optical block 3 in the radial direction of the disk 1. The bias magnet driver 13 drives a deflection magnet 5. The spindle driver 14 drives the spindle motor 2.

The focus driver 10 moves the objective lens toward or away from the disk 1 in accordance with the control signal supplied from the digital signal processor 9. The laser beam emitted from the optical block 3 is thereby focused on the recording surface of the magneto-optical disk 1. The digital signal processor 9 has generated the control signal from the focus error signal supplied from the optical block 3.

The tracking driver 11 moves the objective lens in accordance with the control signal supplied from the digital signal processor 9. The objective lens is moved across the tracks provided on the recording surface of the magneto-optical disk 1. The laser beam emitted from the optical block is thereby applied to the target track. The digital signal processor 9 has generated the control signal from the tracking-error signal supplied from the optical block 3.

The slide driver 12 moves the optical block 3 in the radial direction of the magneto-optical disk 1 in accordance with a control signal supplied from the digital signal processor 9. The digital signal processor 9 has generated this control signal from the slide signal supplied from the optical block 3. The optical block 3 is moved in the radial direction of the disk 1 for a distance longer than the tracking driver 11 moves the objective lens. The motion of the optical block 3 is therefore called "coarse motion."

The bias magnet driver 13 drives the deflection magnet 5 in accordance with a control signal supplied from the digital signal processor 9. The deflection magnet 5 is used to erase data from the data section of each sector provided on the magneto-optical disk 1.

In most cases, the magneto-optical disk drive records data in only the data section of each sector of the magneto-optical disk 1. The header section serves as a reference position of the data section.

The magneto-optical disk drive may formats the magneto-optical disk 1 by providing header sections on the disk 1. If this is the case, the bias magnet driver 13 drives the deflection magnet 5 such that two magnetic fields of opposite directions are applied into the first part 32 and second part 33 of the header section 31. Thus, data can be read from the first part 32 and second part 33 of the header section 31, without the necessity of inverting the magnetic fields at the time of recording or erasing the data.

The spindle driver 14 drives the spindle motor 2 in accordance with a spindle start/brake (SPSB) control signal supplied from the digital signal processor 9. The digital signal processor 9 generates the spindle start/brake control signal from a spindle-frequency generating (SPFG) signal and a spindle lock (SPLK) signal, both supplied from the spindle driver 14. The spindle start/brake control signal, spindle-frequency generating (SFFG) signal and spindle lock (SPLK) signal will be described later in detail.

How the magneto-optical disk drive operates will be described in greater detail.

To reproduce data signals from the magneto-optical disk 1, the optical block 3 applies a laser beams to the magneto-optical disk 1 and receives the laser beam reflected from the disk 1. Data signals are generated from the laser beam reflected from the disk 1 by virtue of Kerr effect. Kerr effect is the phenomenon that, when a polarized beam is applied to a vertically magnetized film, the beam reflected from the film is rotated in one direction or the other.

The optical block 3 has an analyzer and a photodiode. The laser beam reflected from the magneto-optical disk 1 passes through the analyzer 31. The analyzer detects the intensity of the laser beam. The photodiode 32 converts the intensity of the beam to an electric signal.

The read channel 7 converts the radio-frequency signal thus generated, to a digital signal. The digital signal, or data to be read, is supplied to the controller 6.

Figure 1A:
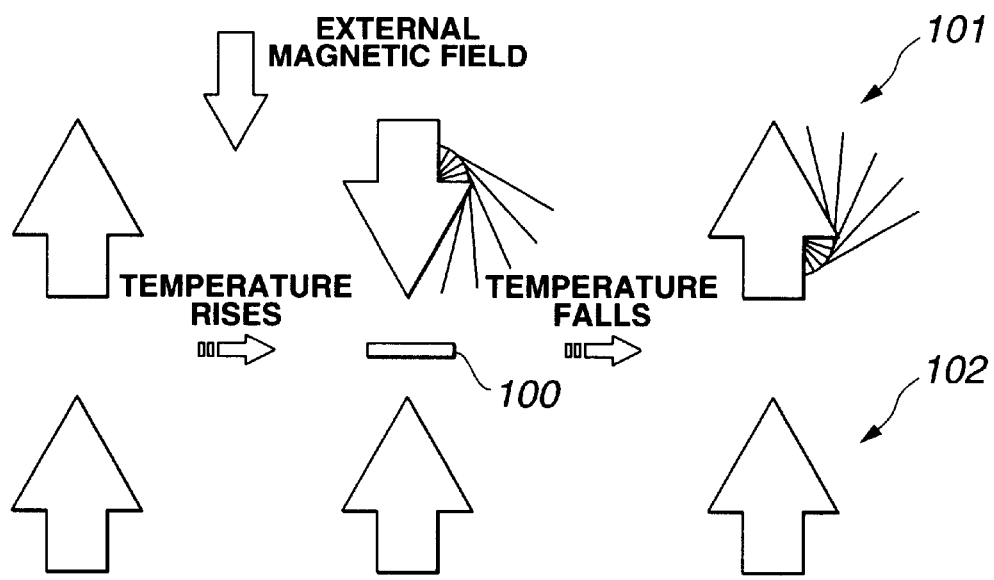
FIG. 1 is a diagram explaining the principle of MSR achieved by FAD.
Figure 1B:
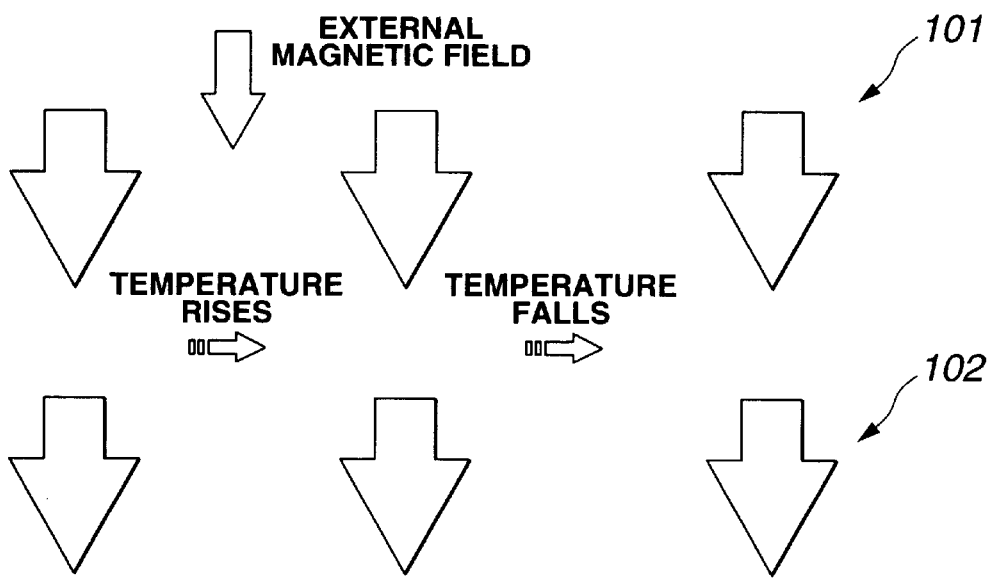
Figure 2A:
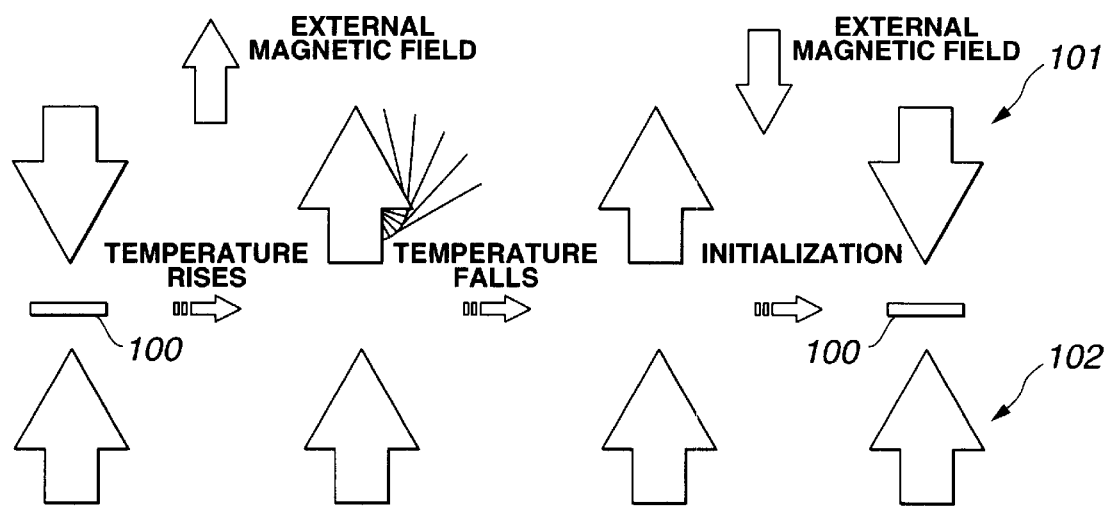
FIG. 2 is a diagram explaining the principle of MSR attained by RAD.
Figure 2B:
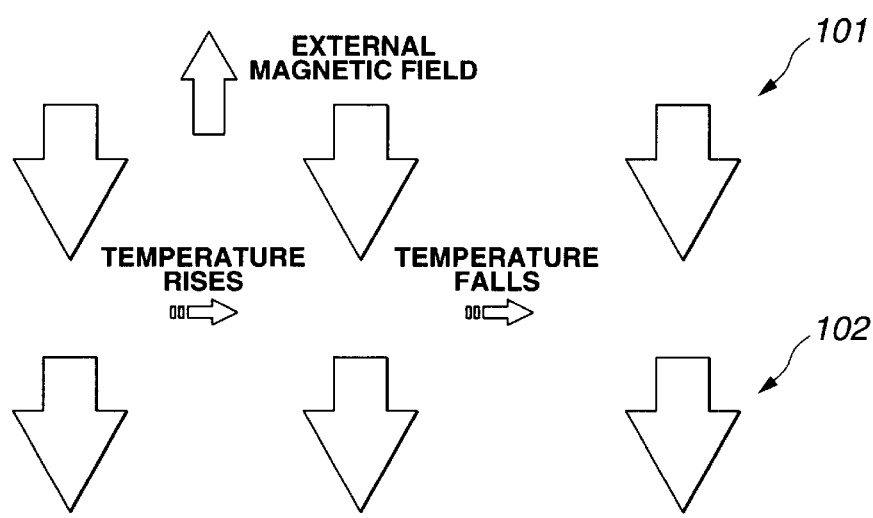
Figure 3:
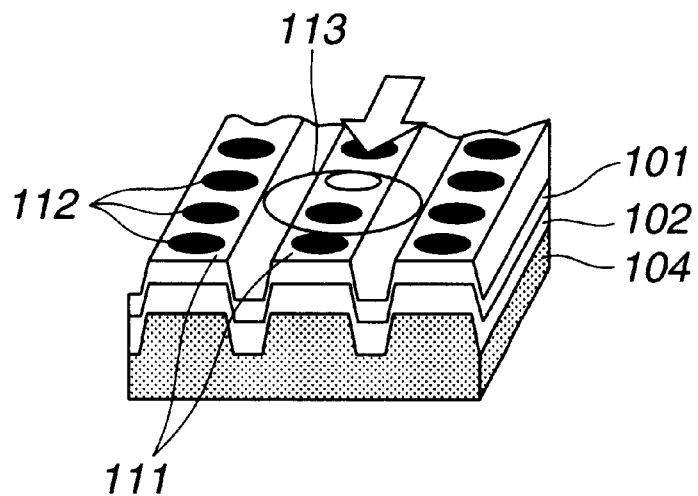
FIG. 3 is a diagram explaining how FAD and RAD are performed.
Figure 3:
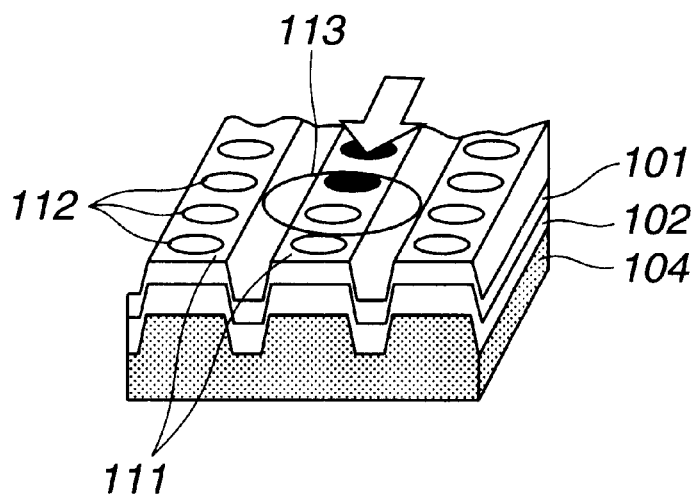
Figure 4A:
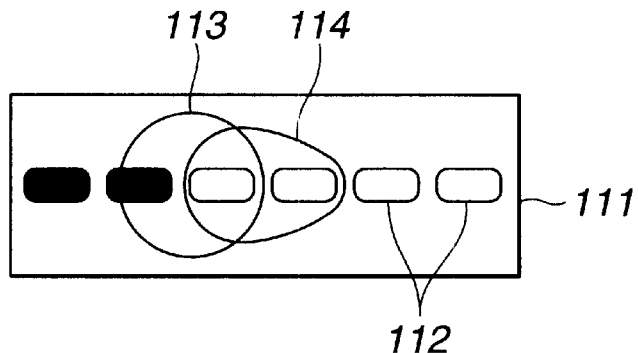
FIG. 4 is a diagram illustrating various methods of achieving MSR.
Figure 4B:
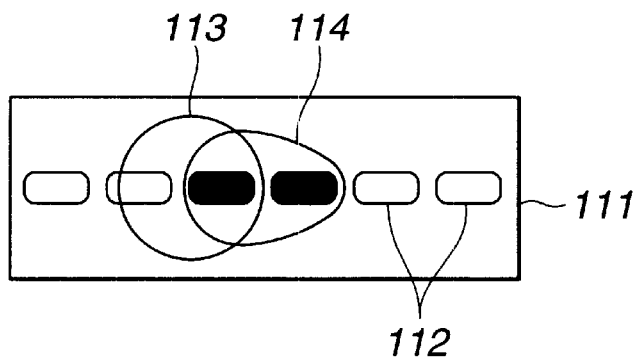
Figure 4C:
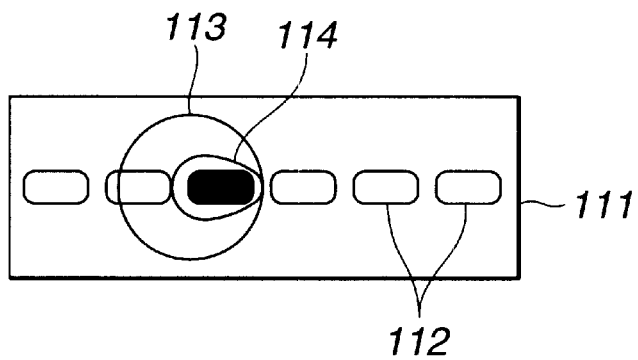
Figure 5A:
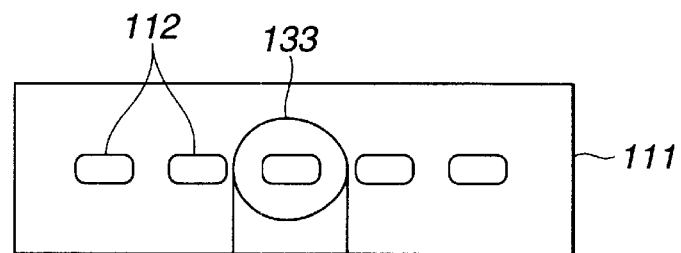
FIG. 5 a diagram explaining how CAD is performed.
Figure 5B:
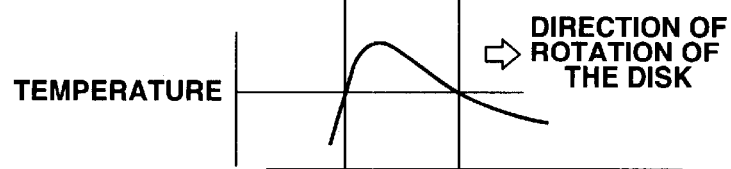
Figure 5C:
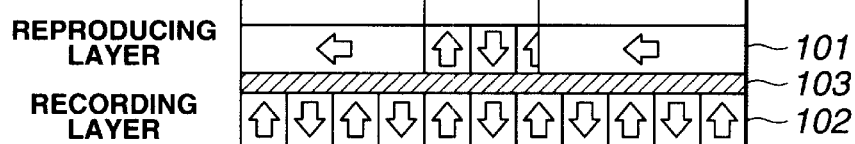

As indicated above, the present embodiment attains MSR by means of RAD illustrated in FIG. 2.

To erase the data signals recorded on the magneto-optical disk 1, the controller 6 drives the digital signal processor 9, which controls the bias magnet driver 13. The bias magnet driver 13 drives the deflection magnet 5, thus applying an external magnetic field to the magneto-optical disk 1.

In the embodiment of the invention, data signals are erased from the data section 23 of each sector provided on the disk 1. Usually, the servo data or the like recorded in the header section 31 of the sector is not erased.

The slider driver and the tracking driver 11 move the optical block 3 in the radial direction of the disk 1 to a desired position over the magneto-optical disk 1. The laser beam emitted from the optical block 3 is switched to one for erasing data. The objective lens focuses this beam on the signal-recording surface of the magneto-optical disk 1. The laser beam is continuously applied to the disk 1, while the external magnetic field applied by the deflection magnet 5 magnetizes the all parts of data section 23 of the sector provided on the disk 1 in the same direction.

To record data signals on the data section 23 of the sector provided on the magneto-optical disk 1, a laser beam is applied to the data section 23 after the previously recorded data signals have been erased from the data section 23. The data signals are thereby recorded on the data section 23.

More precisely, after data has been erased from the data section 23 by magnetizing all parts of the data section 23 in the same direction with the external magnetic field, a laser beam is applied to only the pits where new data should be recorded. The parts of the disk 1 which are irradiated with the laser beam are heated to a temperature over the Curie point. These parts of the disk 1 therefore transits from a ferromagnetic state to a paramagnetic state and magnetized in the direction of the external magnetic field applied to them. In this process, the laser-power controller 8 controls the laser diode of the optical block 3 in accordance with the write data supplied from the controller 6.

To record data signals on, or reproduce them from, the magneto-optical disk 1, the focus driver 10 moves the objective lens toward or away from the disk 1. The laser beam emitted from the optical block 3 is thereby focused on the signal-recording surface of the disk 1 that is rotated by the spindle motor 2.

The tracking driver 11 is controlled, making the laser beam emitted from the optical block 3 trace the recording track provided on the signal-recording surface of the magneto-optical disk 1. The recording track may be a land formed on the magneto-optical disk 1. In practice, the digital signal processor 9 controls the tracking driver 11 so that the tracking error signal output from the photo detector provided in the optical block 3 may have value "0" at all times.

The slider driver 12 is controlled to eliminate displacement of the objective lens from the centerline of the track, which has been detected by the midpoint sensor incorporated in the optical block 3. More specifically, the digital signal processor 9 reduces the value of the slide error signal output from the midpoint sensor to zero (0).

The three drivers described above, i.e., the focus driver 10, tracking driver 11 and slider driver 12, cooperate to focus the laser beam on the magneto-optical disk 1 and to make the laser beam trace the track provided on the disk 1. Whether the photodiode receives a sufficient amount of light is determined from a pull-in signal supplied from the optical block 3.

The spindle motor 2 and the components associate with the motor 2 will be now described. The spindle driver 14 drives the spindle motor 2. The spindle driver 14 starts driving the motor 2 upon receipt of the spindle start/brake control signal supplied from the digital signal processor 9. When the rotation speed of the motor 2 reaches a predetermined value, the spindle driver 14 outputs a spindle lock signal to the digital signal processor 9. To stop the spindle motor 2, the digital signal processor 9 inverts the polarity of the spindle start/brake signal. The spindle driver 14 generates a spindle-frequency generating signal that consists of four rectangular waves. The digital signal processor 9 can determine the rotational speed of the spindle motor 2 from the duration of the spindle-frequency generating signal. When the duration of the spindle-frequency generating signal increases over a prescribed value, it is determined that the spindle motor 2 has stopped.

The linear encoder 15 is held near the spindle motor 2 and above the block carriage 4 on which the optical block 3 can move. The block carriage 4 incorporates a voice coil motor (VCM). A linear scale (not shown) is secured at one end to the coil of the voice coil motor and extends in parallel to the linear encoder 15. Thus, when the optical block 3 moves on the block carriage 4, the linear encoder 15 generates an electric signal. More precisely, two waves that differ in phase by 90° are generated from the A phase and B phase of the linear encoder 15.

The signal generated by the linear encoder 15 is supplied to the digital signal processor 9. The processor 9 determines the distance and direction in which the optical block 3 has moved, from the number waves composing the signal and the phase of the signal. Hence, the processor 9 serves to set the optical block 3 at a desired position.

In the embodiment described above, MSR is attained by means of RAD. The present invention is not limited to the embodiment. Rather, MSR can be achieved by means of FAD or CAD.

In the embodiment described above, the MSR technique is applied to a magneto-optical disk. This invention is not limited to the embodiment. For example, with the invention it is possible to record data on a phase-change disk at so high a density that images of super resolution may be reproduced from the disk.

What is claimed is:

1. A method of recording header data on a disk, comprising the steps of:
   providing a disk having a plural-track data-recording surface, with a respective track having a data section, in which units of data are to be recorded; and
   forming only one header section provided before the data section, the header section serving as a reference position for dividing said track into sectors, said header section being defined by prepits formed in the data-recording surface, thereby facilitating recording data in the header section at such a high density that the header data is reproduced with super resolution.

2. The method according to claim 1, wherein the super resolution is magnetically induced super resolution.

3. The method according to claim 1, wherein data is recorded in a first part of the header section by applying an external magnetic field in a first direction and in a second part of the header section by applying the external magnetic field in a second direction different from the first direction.

4. A method of recording data on a disk, comprising the steps of:
   providing a disk having a plural-track data-recording surface, with a respective track having a data section, in which units of data are to be recorded; and
   forming only one header section provided before the data section, the header section serving as a reference position for dividing said track into sectors, said header section being defined by prepits formed in the data-recording surface, thereby facilitating recording data in the data section at such a high density that the data is reproduced with super resolution.

5. An apparatus for recording data on a disk, comprising:
   a disk having a plural-track data-recording surface, with a respective track having a data section, in which units of data are to be recorded; and
   means for forming only one header section provided before the data section, the header section serving as a reference position for dividing said track into sectors, said header section being defined by prepits formed in the data-recording surface, thereby facilitating recording data in the header section at such a high density that the header data is reproduced with super resolution.

6. The apparatus according to claim 5, wherein the super resolution is magnetically induced super resolution.

7. The apparatus according to claim 5, further comprising means for applying an external magnetic field in a first direction to record data in a first part of the header section and means for applying the external magnetic field in a second direction different from the first direction to record data in a second part of the header section.

8. A recording medium comprising a data-recording surface formed of plural tracks, with a respective track having a data section in which units of data are to be recorded, and only one header section provided before the data section, the header section serving as a reference position for dividing said track into sectors, said header section being defined by prepits formed in the data-recording surface, wherein data is recorded in the header section at such a high density that the header data is reproduced with super resolution.

9. The recording medium according to claim 8, wherein the super resolution is magnetically induced super resolution.

10. The recording medium according to claim 8, wherein data is recorded in a first part of the header section by applying an external magnetic field in a first direction and in a second part of the header section by applying the external magnetic field in a second direction different from the first direction.

* * * * *